United States Patent
Heo et al.

(10) Patent No.: US 9,600,691 B2
(45) Date of Patent: Mar. 21, 2017

(54) APPARATUS AND METHOD FOR NOTIFYING OF SECURITY INFORMATION IN ELECTRONIC DEVICE AND COMPUTER-READABLE RECORDING MEDIUM FOR THE SAME

(71) Applicant: Samsung Electronics Co., Ltd., Gyeonggi-do (KR)

(72) Inventors: Younkyu Heo, Gyeonggi-do (KR); Youngkyoo Kim, Seoul (KR); Mooyoung Kim, Seoul (KR); Minjung Kim, Gyeonggi-do (KR); Dongho Jang, Gyeonggi-do (KR); Jaebong Chun, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/260,652

(22) Filed: Apr. 24, 2014

(65) Prior Publication Data

US 2014/0325679 A1    Oct. 30, 2014

(30) Foreign Application Priority Data

Apr. 24, 2013   (KR) .................. 10-2013-0045782

(51) Int. Cl.
 *H04L 29/06* (2006.01)
 *G06F 21/74* (2013.01)
 *G06F 21/60* (2013.01)

(52) U.S. Cl.
 CPC ............ *G06F 21/74* (2013.01); *G06F 21/606* (2013.01)

(58) Field of Classification Search
 CPC .................................... G06F 21/606
 USPC ........................................... 726/28
 See application file for complete search history.

(56) References Cited

U.S. PATENT DOCUMENTS

| | | | |
|---|---|---|---|
| 7,370,210 B2 * | 5/2008 | Symes | G06F 9/4812 380/229 |
| 7,496,768 B2 * | 2/2009 | Roberts et al. | 713/193 |
| 7,689,939 B1 | 3/2010 | Becker | |
| 2002/0129110 A1 | 9/2002 | Liu et al. | |
| 2002/0147524 A1 | 10/2002 | Nickum | |
| 2003/0009602 A1 | 1/2003 | Jacobs et al. | |
| 2003/0131143 A1 | 7/2003 | Myers | |
| 2004/0003286 A1 * | 1/2004 | Kaler et al. | 713/201 |
| 2005/0204138 A1 | 9/2005 | Chiu | |
| 2008/0082936 A1 | 4/2008 | Helvick | |
| 2010/0070980 A1 | 3/2010 | Tanaka et al. | |

(Continued)

FOREIGN PATENT DOCUMENTS

KR   1006263610000   9/2006

OTHER PUBLICATIONS

European Search Report dated Oct. 28, 2016 issued in counterpart application No. 14787929.0-1870, 6 pages.

*Primary Examiner* — Longbit Chai
(74) *Attorney, Agent, or Firm* — The Farrell Law Firm, P.C.

(57) ABSTRACT

An apparatus and a method for displaying information required to be secured in a wireless communication terminal are provided. The method includes recognizing generation of notification information of one or more processes activated in a first operation mode among a plurality of operation modes including the first operation mode and a second operation mode; and notifying a user of a part of the notification information when a current operation mode is the second operation mode.

17 Claims, 9 Drawing Sheets

(56) References Cited

U.S. PATENT DOCUMENTS

2012/0084793 A1 4/2012 Reeves et al.

* cited by examiner

APPARATUS AND METHOD FOR NOTIFYING OF SECURITY INFORMATION IN ELECTRONIC DEVICE AND COMPUTER-READABLE RECORDING MEDIUM FOR THE SAME

PRIORITY

This application claims priority under 35 U.S.C. §119(a) to Korean Patent Application No. 10-2013-0045782, filed in the Korean Intellectual Property Office on Apr. 24, 2013, the entire disclosure of which is incorporated herein by reference.

BACKGROUND OF THE INVENTION

1. Field of the Invention

The present invention relates generally to an apparatus and a method for notifying of information in an electronic device, and more particularly, to an apparatus and a method for notifying of information requiring security in an electronic device.

2. Description of the Related Art

The use of wireless communication terminals, such as electronic devices, mobile devices, smart phones, tablet Personal Computers (PCs), and the like, has increased in both the user's personal life and in the business world, and the utilization of the wireless communication terminals for tasks within businesses also has increased.

According to the increase in the utilization of the wireless communication terminals in business, such as companies and corporations, a problem concerning the security of the wireless communication terminal for processing documents or other data used in a business has appeared. Accordingly, in order to enhance the security of wireless communication terminals, security companies have developed security solutions which can be added to the wireless communication terminals, and these security solutions are sold in a Business to Business (B2B) market.

Representative B2B device security solutions which are currently used in the wireless communication terminals include VMWare and an OS division method.

When VMWare is used, a separate process is executed to use applications of divided memory areas. The process to use the applications of the divided areas occupies a memory to drive the corresponding process and the corresponding process is driven by a Central Processing Unit (CPU). Accordingly, when VMWare is used, an additional memory for driving the process is needed and a high speed CPU is also needed.

Since the OS division method drives respective OSs at the same time or switching of the OS driving is not free, it is not easy to receive, in real time, information of different areas placing importance on real time transference, for example, an e-mail notification.

That is, security solutions of the wireless communication terminals which have been provided up to now still have difficulty in displaying information required to be secured while securing the real time transference.

In order to use electronic devices for a business purpose, companies separately give office electronic devices to their employees, or mount a security solution to personal electronic devices for an individual purpose owned by employers (employees) to use the personal electronic device in the company. When one electronic device used for business purposes is being used for an individual purpose in a particular case, requirements between the employer and the employee frequently conflict with each other.

For example, a conflict exists when the employer requires a particular security solution to be mounted in the electronic device in order to safely protect the company's property and the employee desires to protect personal information corresponding to the privacy from the company.

In order to satisfy the demands of both the employer and the employee, separate spaces for applications or data for business purposes and applications or data for individual purposes are supported, and thus the security of the electronic device can be provided.

A security mode may be set to encrypt data and store the encrypted data in a memory area which is separated from a non-security mode and allocated to the security mode. The security mode may be set to allow only authenticated users to access the data stored in the memory area allocated to the security mode. The non-security mode may be a mode set which does not require encryption or authentication in the data access.

For example, when a request for access to resources set to be accessible only in the security mode is detected while the non-security mode is activated, the detected request for the access may be first blocked and a request for an additional authentication for the access to resources of the security mode may be made to the user.

The user of the electronic device experiences much inconvenience in the above described security mode.

For example, when a notification of the use for the individual purpose is generated, situations in which the security is violated occur in succession and the electronic device informs the user of the security violation in the security violation situation. Accordingly, when the user of the electronic device uses the electronic device in the security mode, notifications of the security violation according to the notification of the use for the individual purpose are excessively output. This is typically contrary to the employer's policies.

In contrast, when the user uses the electronic device for the individual purpose (hereinafter referred to as a "non-security mode"), notifications used for an e-mail of the company or other business areas of the company may be generated. In this event, matters required to be secured are provided to the user through the notification in the non-security mode, and the company may experience unwanted leakage of information.

SUMMARY OF THE INVENTION

The present invention has been made to address at least the above described problems and disadvantages, and to provide at least the advantages described below.

Accordingly, an aspect of the present invention provides an apparatus and a method for displaying information required to be secured in an electronic device.

Another aspect of the present invention provides an apparatus and a method for displaying, in real time, information required to be secured in an electronic device.

Another aspect of the present invention provides an apparatus and a method for displaying, in real time, information required to be secured and information which is not required to be secured in an electronic device, and displaying information not required to be secured after removing displayed information required to be secured from the information required to be secured.

In accordance with an aspect of the present invention, a method of controlling information using an electronic device is provided. The method includes recognizing generation of notification information of one or more processes activated in a first operation mode among a plurality of operation modes including the first operation mode and a second operation mode; and notifying a user of a part of the notification information when a current operation mode is the second operation mode.

In accordance with another aspect of the present invention, an electronic device is provided. The electronic device includes a recognition module set to recognize generation of notification information of one or more processes activated in a first operation mode among a plurality of operation modes including the first operation mode and a second operation mode; and a notification module set to notify a user of a part of the notification information when a current operation mode is the second operation mode.

In accordance with another aspect of the present invention, a storage medium storing commands, the commands being set to allow one or more processes to perform one or more operations when the commands are executed by the one or more processes is provided. The one or more operations includes recognizing generation of notification information of one or more processes activated in a first operation mode among a plurality of operation modes including the first operation mode and a second operation mode; and notifying a user of a part of the notification information when a current operation mode is the second operation mode.

BRIEF DESCRIPTION OF THE DRAWINGS

The above and other aspects, features and advantages of the present invention will be more apparent from the following detailed description in conjunction with the accompanying drawings, in which.

DETAILED DESCRIPTION OF EMBODIMENTS OF THE PRESENT INVENTION

Figure 1:
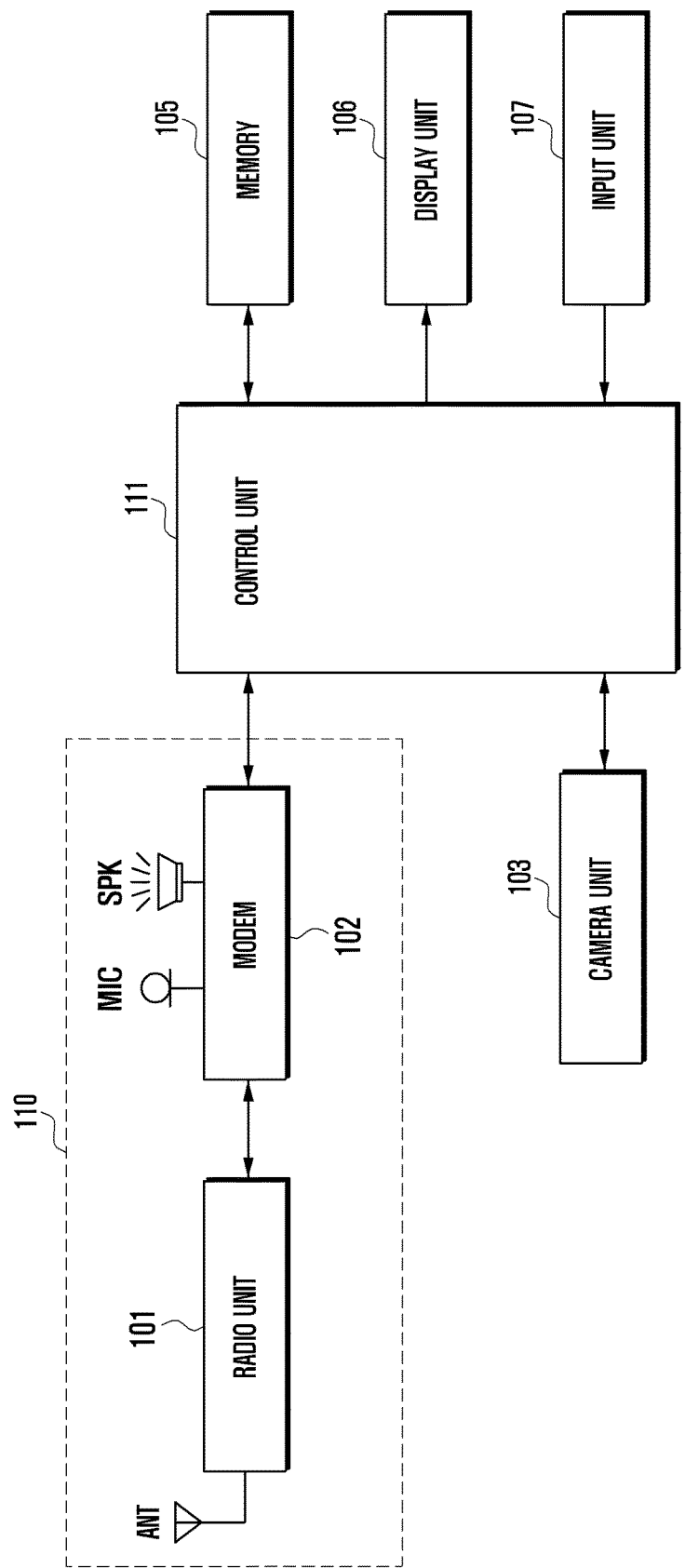
FIG. 1 is a block diagram illustrating an electronic device according to an embodiment of the present invention.

Hereinafter embodiments of the present invention will be described with reference to the accompanying drawings. The accompanying drawings of this specification are provided to help understating embodiments of the present invention and it should be noted that the present invention is not limited by types or layouts illustrated in the accompanying drawings of this specification. Further, the equivalents or expansions for additional embodiments of the accompanying drawings of this specification should be understood by the description referring to the drawings.

According to embodiments disclosed in this specification, when notification information of a security mode is required to be displayed while an electronic device having the security mode and a non-security mode operates in the non-security mode, an indication informing the user that there is the notification information of the security mode may be displayed in real time. Accordingly, the user can immediately detect the generation of the notification information in the security mode to take action in time.

Further, when the notification information of the security mode is required to be displayed in the non-security mode, the electronic device provides some information such as an event type indicating which event has been generated and a number of generated events, thereby preventing unnecessary information from being leaked.

Embodiments disclosed in this specification provide a display method capable of providing security when an event required to be secured, such as a company e-mail, is generated in the electronic device, which can be used in both the security mode and the non-security mode, and a notification message of the event is displayed.

The electronic device according to various embodiments of the present invention may be a desktop Personal Computer (PC), a laptop PC, a Personal Digital Assistant (PDA), a Portable Multimedia Player (PMP), a tablet PC, a mobile phone, a video phone, a feature phone, a smart phone, an electronic book reader, a digital camera, a wearable device, a wireless device, a Global Positioning System (GPS) system, a hand-held device, an MP3 player, a camcorder, a game console, an electronic watch, a flat panel device, an electronic photograph, an electronic board, an electronic sign board, a projector, a navigation device, a black box, a set-top box, an electronic dictionary, a refrigerator, an air conditioner, a vacuum cleaner, an artificial intelligence robot, a TeleVision (TV), Digital Versatile Disk (DVD) player, a stereo, an oven, a microwave oven, a washing machine, an air cleaner, a medical device, a vehicle device, a shipbuilding device, an aircraft device, a security device, agricultural, livestock, fishery equipment, electronic clothing, an electronic key, an electronic bracelet, an electronic necklace, and the like. For example, the electronic devices may be driven by various operating systems, such as Android, iOS, Windows, Linux, Symbian, Tizen, and Bada. It is apparent to those skilled in the art that the electronic device and the operating system according to embodiments of the present invention are not limited to the above described examples.

FIG. 1 is a block diagram illustrating the electronic device according to an embodiment of the present invention.

The electronic device includes a communication module 110, a camera unit 103, a memory 105, a display unit 106, an input unit 107, and a controller 111. The electronic device may include other components as well as the components illustrated in FIG. 1, or may not include some of the components illustrated in FIG. 1, for example, the camera unit 103.

The communication module 110 include an antenna ANT, a radio unit 101, a modem 102, a microphone MIC, and a speaker SPK. The antenna ANT is manufactured in accordance with a band for transmitting and receiving a frequency signal required for communication of a portable terminal and is connected to the radio unit 101. In the following description, it is assumed that the communication module 110 accesses a mobile communication network. However, the communication module 110 may access a wireless network, such as a wireless Local Area Network (LAN), instead of the mobile communication network. In this event, all the components illustrated in FIG. 1 may be also included.

The radio unit 101 band up-converts data to be transmitted for voice or/and data communication with the mobile communication network and band down-converts the received data. That is, the radio unit 101 band up-converts data of a baseband for data transmission and transmits the data to the corresponding network through the antenna ANT, and receives a radio signal from the corresponding network through the antenna ANT, band down-converts the radio signal, and converts the radio signal to a baseband signal.

The modem 102 performs a series of data processing, such as modulation, demodulation, encoding, and decoding of the data. In FIG. 1, since it is assumed that voice communication is possible, the modem 102 may include a vocoder for performing modulation/demodulation and encoding/decoding of a voice signal. When the vocoder is operated, the modem 102 receives an electrical voice signal from the microphone MIC and converts the received electrical voice signal to a digital voice signal, and also encodes the digital voice signal. Further, when the vocoder is operated, the modem 102 converts the digital voice signal to be output to an analog electrical voice signal and outputs the analog electrical voice signal through the speaker SPK. In data communication which does not use the vocoder, the modem 102 may perform a series of operations, such as modulation, demodulation, encoding, and decoding of data to be transmitted/received by a control of the controller 111.

The camera unit 103 acquires still image data or dynamic image data by receiving light reflected from a subject through a lens or converting the light reflected from the subject to an electrical signal. The camera unit 103 converts the acquired still image data or dynamic image data to data having the type which can be processed by the controller 111 and provides the converted data to the controller 111.

The memory 105 refers to a storage medium, such as a Read Only Memory (ROM) or/and Random Access Memory (RAM) and stores various control data required for operations of the electronic device. According to embodiments of the present invention, the memory 105 stores control data for operations according to the security mode and the non-security mode and data for controlling a display when a particular event is generated in each of the modes. Further, the memory 105 may include areas for storing user data.

The display unit 106 may be implemented in the type of a Liquid Crystal Display (LCD) panel or a Light Emitting Display (LED) panel and may display a state of the electronic device in processes required for the operations of the electronic device, and in a standby state, by a control of the controller 101. Further, the display unit 106 may display all or some of the generated events according to the embodiments of the present invention.

Besides the display unit 106 transmitting visual information, the electronic device may further include an additional component which can transmit various types of information, such as a sound, and a vibration to the user.

The input unit 107 includes all user input interfaces such as a touch input or/and an electronic pen or/and a key input. The input unit 107 receives user input information through each of the input interfaces and provides the information to the controller 111.

Figure 2:
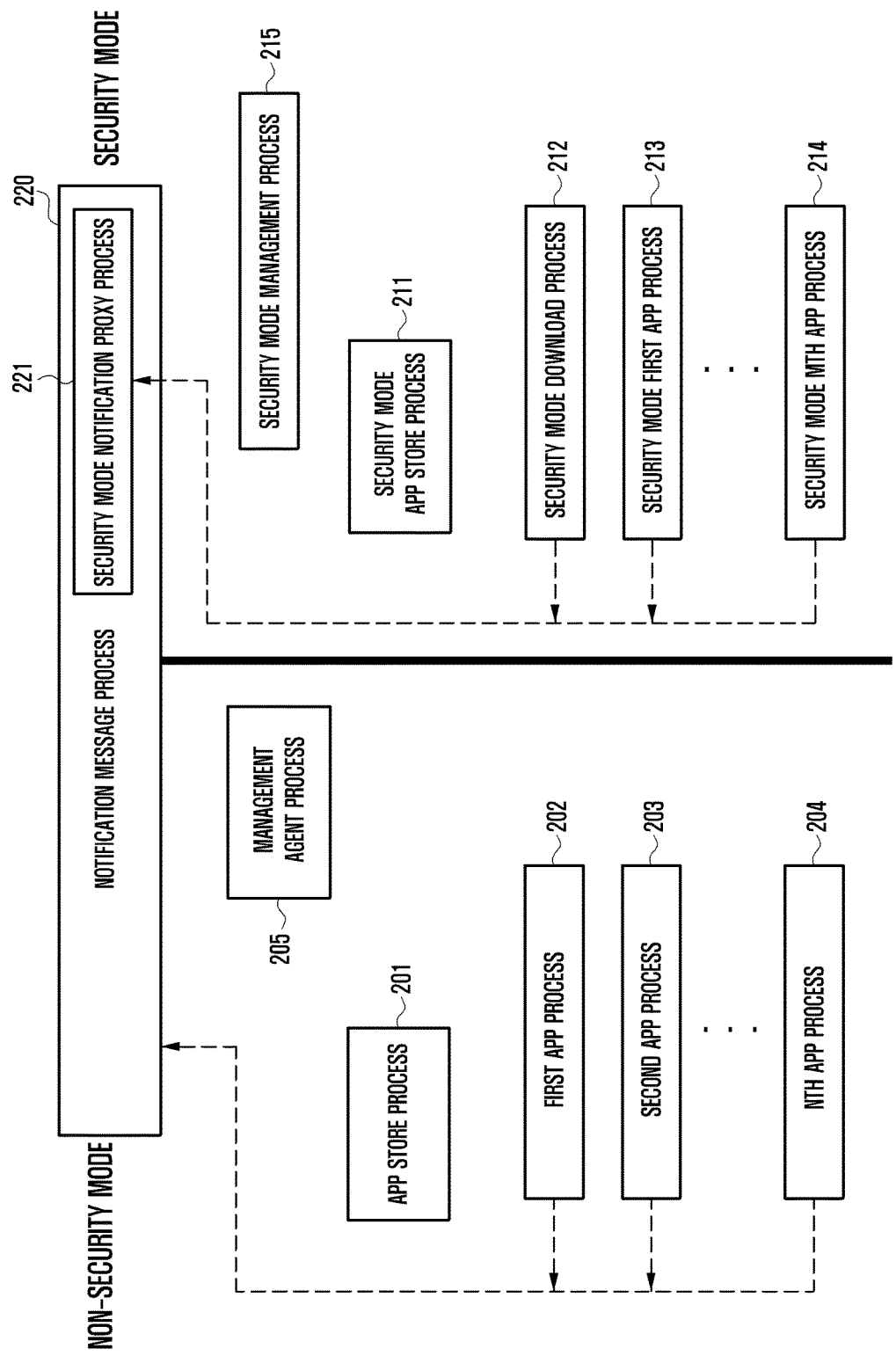
FIG. 2 is a view of processes for separately controlling operations of a non-security mode and a security mode in an electronic device and displaying the separately controlled operations according to an embodiment of the present invention.

FIG. 2 is a block diagram of processes for separately controlling operations of the non-security mode and the security mode in the electronic device and displaying the separately controlled operations according to an embodiment of the present invention.

As illustrated in FIG. 2, there are two modes largely separated such as the non-security mode shown in a left side and the security mode shown in a right side. The non-security mode corresponds to a case where the electronic device is used for individual purposes, and the security mode corresponds to a case where the electronic device is used for business purposes in a company, as described above. In FIG. 2, blocks illustrated in each of the modes may be processes or services for particular operations, and hereinafter it is assumed that the blocks are all processes for convenience of description.

In FIG. 2, the non-security mode and the security mode may be selected by a process (not shown in FIG. 2) for selecting each mode. Accordingly, only one mode is provided to the user through the display unit 106. When the user desires to switch the non-security mode to the security mode, the switching from the non-security mode to the security mode is made through a preset authentication procedure.

In FIG. 2, a notification message process 220 over both the non-security mode and the security mode corresponds to a process for collecting event information provided by a particular process in the non-security mode or the security mode and displaying the collected event information on the display unit 106 through a predetermined method. The notification message process 220 may include a security mode notification proxy process 221 for collecting and providing event information provided by each of the processes of the security mode. When the notification message process 220 does not include the security mode notification proxy process 221, the notification message process 220 may perform an operation of the security mode notification proxy process 221.

The security mode notification proxy process 221 receives event information generated by all application (hereinafter referred to as an "app" processes 212, 213, . . . , 214 operating in the security mode and collect the received event information, and may control events generated by the app processes 212, 213, . . . , 214 to be displayed as one message or displayed, respectively.

Each of the processes of the non-security mode will be first described. The non-security mode includes processes required when the user generally uses the electronic device as described above. An app store process 201 is a process for generally accessing an app store in the electronic device. According to the present invention, the app store process 201 may perform together an operation for generally accessing the app store and an operation for accessing the app store in the security mode. This will be described in more detailed with reference to the drawings described below.

A management agent process 205 is a process required when an app to be used in the security mode is downloaded.

The management agent process 205 will be described in more detail in the drawings described below.

A first app process 202, a second app process 203, and an nth app process 204 may be general app processes. For example, processes 202, 203, . . . , 204 may be app processes for performing a mailing service, a schedule management, and a text message, respectively.

Next, the processes of the security mode will be described. The security mode corresponds to a mode for the company requiring the security. Accordingly, the remaining processes 212, 213, . . . , 214 except for a security mode management process 215 and a security mode app store process 211 are required to have an additional function for the security.

In the following description, it is assumed that a security mode first app process 213 is a process for processing a mailing service.

In general, the security mode first app process 213 performs an encryption to enhance the security of received data while performing an operation for the mailing service. Accordingly, the security mode first app process 213 providing the mailing service includes a module for the encryption and a proxy for inducing mailing service data to be processed in a security enhanced mode. That is, one process may add the module for the encryption and the proxy for the induction of the encryption processing to the basic operations of the process.

Further, the security mode first app process 213 includes a method of, when an address for storing generated data is created, storing the data differently from the processing by a general process. That is, when the security mode first app process 213 corresponds to the mailing service, the security mode first app process 213 generates an address for storing mail data in a preset security area of the memory 105 through a method different from that in which a general mailing service process receives and generates an address for storing the received mail data.

This is also equally applicable to a security mode download process 212. That is, unlike a process of downloading data in the non-security mode, the security mode download process 212 includes an encryption module for encrypting received data and a proxy for inducing the encryption. Further, the method of generating the address for storing the encrypted data may be different from a method in which the non-security mode download process generates an address.

Meanwhile, when a particular event for providing a notification message, such as reception of mail, is generated in a corresponding process, the security mode download process 212, the security mode first app process 213, . . . , and a security mode mth app process 214 provide the generated event to the security mode notification proxy process 221 included within the notification message process 220. At this time, a message generated for informing of the event may have a form different from that of an event notification of the non-security mode. That is, some information such as a type of the generated event is informed of and detailed information on the generated event is not provided. For example, when one mail corresponds to the received event, the corresponding app process informs the security mode notification proxy process 221 only of the reception of the mail and does not inform of a sender and a subject of the mail. That is, when a particular event is generated, all processes of the security mode may be configured to provide only the generation of the corresponding event to the security mode notification proxy process 221.

Then, the security mode notification proxy process 221 directly displays the corresponding message when a current mode is the security mode. In some implementations, the security notification proxy process 221 may inform of the type of generated event regardless of the current mode. This will be described with reference to FIG. 3.

Figure 3:
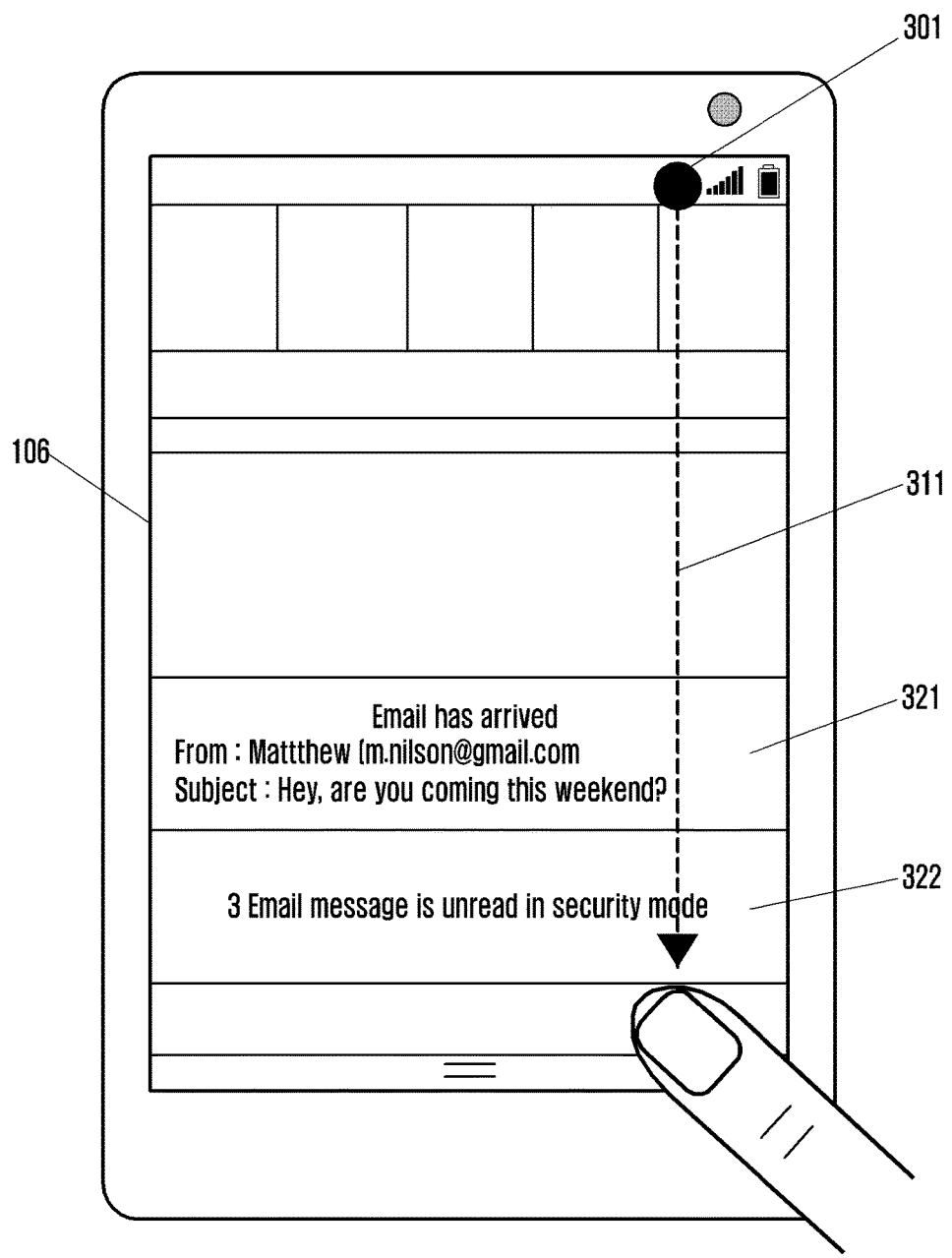
FIG. 3 illustrates an example of a screen displaying a notification message of a non-security mode and a notification message of a security mode on a display unit of an electronic device according to embodiments of the present invention.

FIG. 3 illustrates an example of displaying a notification message of the non-security mode and a notification message of the security mode on the display unit of the electronic device according to embodiments of the present invention.

As illustrated in FIG. 3, the notification message process 220 or/and the security mode notification proxy process 221 control to display the existence of the notification message in an area for informing of the generation of a particular event through a predetermined method. For example, when it is assumed that the electronic device is a terminal providing a user input in a touch screen type, the user may touch the display unit 106 to scroll down in order to identify the notification messages through the touch screen type as indicated by a reference numeral 311. According to the scroll down, the messages are displayed as indicated by reference numerals 321 and 322.

The area 301 for informing of the generation of the particular event according to the present invention may be at least a part of all areas of the electronic device as well as an area illustrated in FIG. 3.

FIG. 3 illustrates a case where a non-security mode mailing app process receives one mail and a security mode mailing app process receives three mails. An order of receiving the mails may correspond to one of the following four orders.

1. Receive non-security mode mail->receive security mode first mail->receive security mode second mail->receive security mode third mail 2. Receive security mode first mail->receive non-security mode mail->receive security mode second mail->receive security mode third mail 3. Receive security mode first mail->receive security second mode mail->receive non-security mode mail->receive security mode third mail 4. Receive security mode first mail->receive security mode second mail->receive security mode third mail->receive non-security mode mail According to the present invention, any of the above four orders can be applied. Further, notification information of mails received according to the four orders may be sequentially stored in a predetermined stack (not shown).

According to embodiments of the present invention, in a case of the non-security mode mail, the notification message process 220 may display reception of a mail (Email has arrived), a sender of the mail (from: Mathew (m.nilson@gmail.com)), and a subject (Subject: Hey, are you coming this weekend?) on the display unit 106 as indicated by the reference numeral 321.

Further, according to embodiments of the present invention, in a case of the security mode mail, the security mode notification proxy process 221 of the notification message process 220 displays an indication (3 Email messages are unread in security mode) simply indicating that three mails have been received in the security mode on the display unit 106 as indicated by the reference numeral 322. In some implementations, when a current mode is the security mode, the security mode notification proxy process 221 may display detailed information of the corresponding message as indicated by the reference numeral 321.

As illustrated in FIG. 3, the notification message by the processes of the non-security mode may be basically configured to show all the detailed contents. In another method of displaying the notification message by the processes of the non-security mode, the message may be informed of as indicated by the reference numeral 321 only in the non-security mode and only the number of messages is informed of as indicated by the reference numeral 322 in the security mode.

It is assumed that a state where the notification message is displayed as illustrated in FIG. 3 corresponds to the non-security mode. In the non-security mode, the user selects a mail notification window 322 of the security mode. In this event, the security mode management process 215 identifies a pre-stored policy file. When an access is not allowed, the security mode management process 215 controls to display a message informing of denial of the access on the display unit 106 as illustrated in FIG. 4A or 4B.

A subject identifying the pre-stored policy file may be the security mode management process 215 or a separate process may exist to identify whether to allow the access. Further, in both cases where there is the separate process and the security mode management process 215 performs whether to allow the access, performs a corresponding function when the access is allowed, and a message informing that the access is not allowed is displayed on the display unit 106 when the access is not allowed.

Figure 4A:
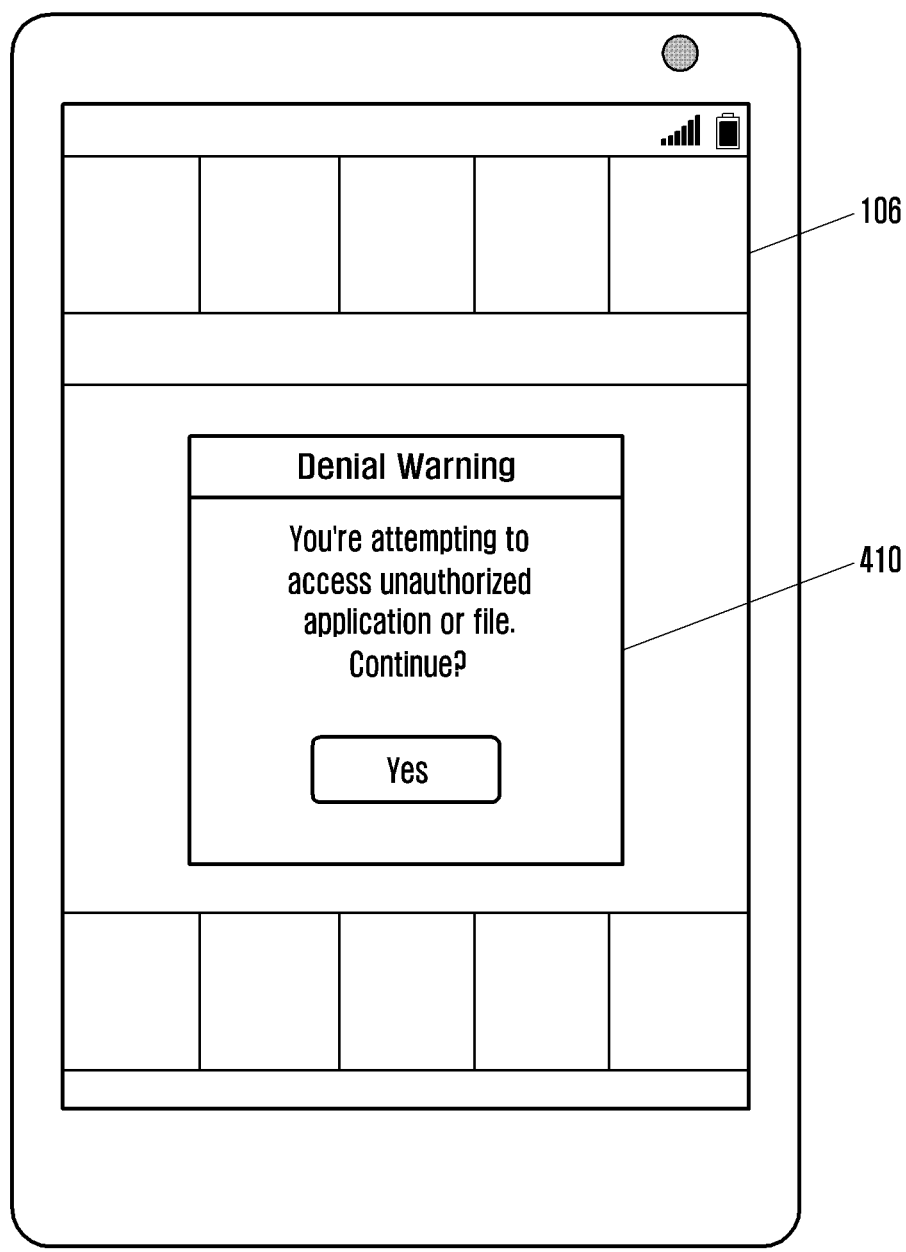
FIGS. 4A and 4B illustrate examples of screens for describing cases where access to a currently set mode and another mode is required and the access is rejected according to embodiments of the present invention.
Figure 4B:
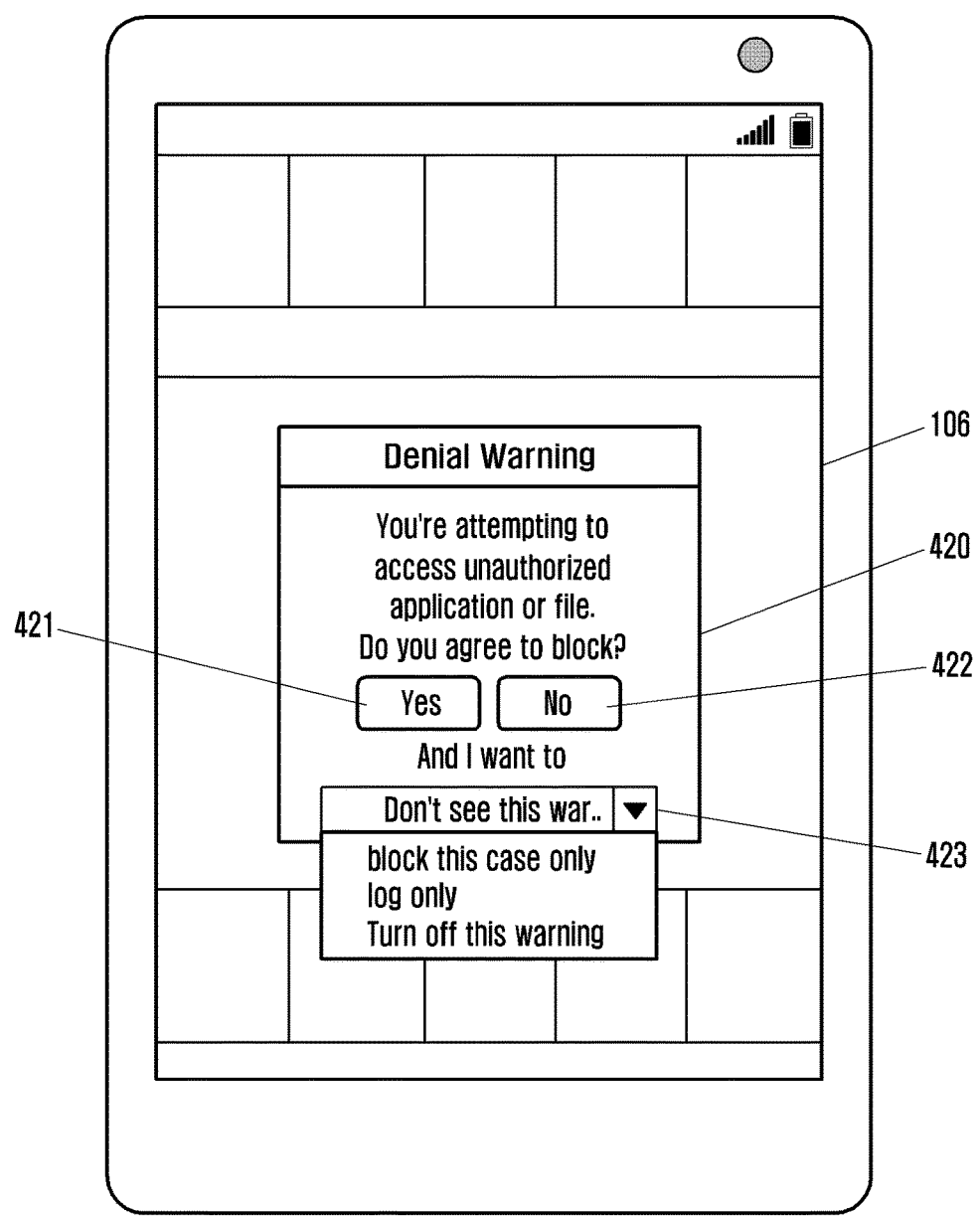

FIGS. 4A and 4B illustrate examples of screens for describing cases where access to a currently set mode and another mode is required and access is denied according to the present invention.

In FIG. 4A, a simple denial popup message 410 for simply informing only that the access is denied is displayed on the display unit 106. In another method, a complex inquiry denial popup message 420 for providing an additional inquiry to ask the user about whether to continuously display a denial message together with the denial of the access is displayed on the display 106 in FIG. 4B.

In the complex inquiry rejection popup message 420, selection icons 421 and 422 for identifying whether to accept the denial of the access and an inquiry icon 423 for asking about a later access permission type are displayed. As illustrated in FIG. 4B, the selection icons 421 and 422 for identifying whether to accept the denial may be configured to have selected Yes 421 when the denial is accepted and to have selected No 422 when the denial is not accepted.

Further, in the complex inquiry denial popup message 420, the inquiry icon 423 about the later access permission type may be included. The access permission type illustrated in FIG. 4B may include the following four types.

1. "Don't see this warning . . . "
2. "Block this case only"
3. "Log only"
4. "Turn off this warning"

When a number of additional cases of the access permissions should be added to the above listed access permission types, other cases may be further added. When there are unnecessary access permission types in the above listed access permission types, the corresponding access permission types may be deleted so that the number of cases may be reduced.

Based on the above description, a method of providing information of the security mode in the non-security mode will be described.

When an event placing importance on real time transference is generated in the security mode while the user uses the electronic device in the non-security mode, each of the processes of the security mode provides minimum information on the generated event to the notification message process 220 or the security mode notification proxy process 221.

Then, the notification message process 220 or the security mode notification proxy process 221 receives corresponding event information and outputs received data through the display unit 106. Accordingly, a message of the security mode placing importance on the real time transference may be identified also in the non-security mode.

Next, based on the above description, a method of changing a processing method when a security policy is violated in the non-security mode will be described.

A process or a service corresponding to a subject which processes an operation according to whether the security policy is violated in the non-security mode may be set by a domain to be accessed in advance, that is, according to whether the security mode or the non-security mode is used. The setting may be stored in a predetermined file or received from an external device such as a server.

Each of the subjects has a label defining an access authority for an object which the subject desires to use, that is, a file or a folder, and the label may be compressed or converted to a policy file and then stored in a preset area of the memory 105.

Accordingly, the object set to be used in the security mode, for example, a DataBase (DB), a file, a folder, or/and an application may be accessed by a particular process or service or the user in the security mode. In this event, the security mode management process 215 for managing the access detects an access violation action with reference to the policy file.

Accordingly, when a particular process violates a policy, the security mode management process 215 controls to display a simple denial popup message 410 or a complex inquiry denial popup message 420 on the display unit 106 according to a set mode. Embodiments of the present invention include the following six modes.

1. Enforcing Mode 1 use notification: forcibly prohibit offenses and inform every violation
2. Enforcing Mode 2 use notification: forcibly prohibit offenses and do not inform
3. Enforcing Mode 3 use notification: forcibly prohibit only this behavior
4. Permissive Mode 1 use notification: inform user but do not forcibly prohibit
5. Permissive Mode 2 use notification: do not inform user and only perform logging
6. Permissive Mode 3 use notification: no action With the output of the above listed popup messages, a sound, a vibration or/and transmission of a message informing another electronic device such as a server of the corresponding situation may be also used.

Figure 5:
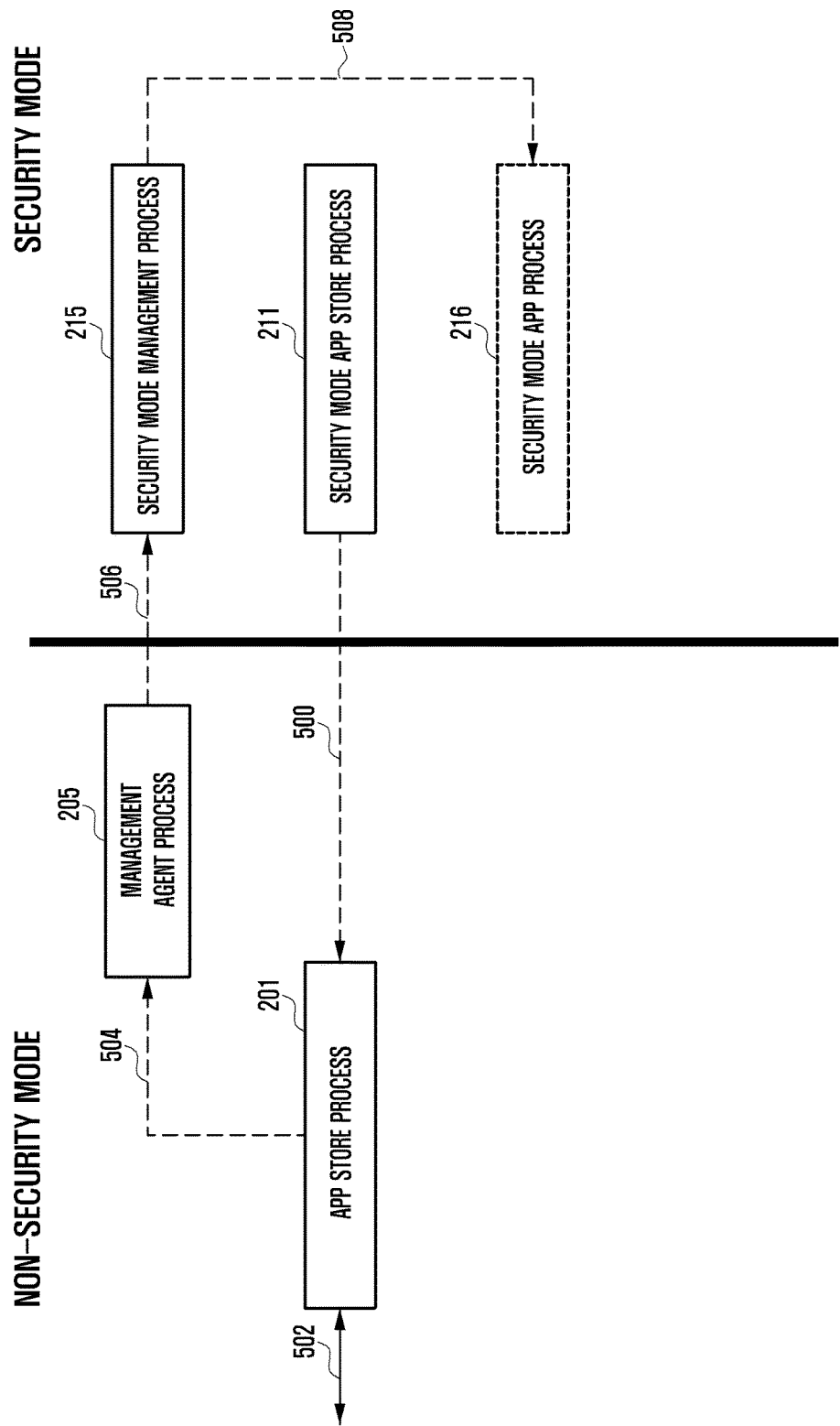
FIG. 5 is a view describing operations of processes when an electronic device having a security mode and a non-security mode downloads an application of the security mode and installs the downloaded application in the security mode according to embodiments of the present invention.

FIG. 5 is a view describing operations of processes when the electronic device having the security mode and the non-security mode downloads an app of the security mode and installs the downloaded app in the security mode according to embodiments of the present invention.

When the security mode app store process 211 is executed, the security mode app store process 211 executes the app store process 201 of the non-security mode in step 500. At this time, since the app store process 201 of the non-security mode is required to access an app store by the app store process 211 of the security mode, the app store process 201 of the non-security mode controls the communication module 110 to access a server having an app for the security mode in the app store, receives a list of security apps which can be installed, and displays information of the received list on the display unit 106 in step 502.

When a particular security app is required to be installed, that is, when a predetermined security app is required to be downloaded and installed by a command of the user or a particular server, the app store process 201 controls the communication module 110 to receive the security app from the corresponding server and provides the received security app to the management agent process 205 in step 504.

When all app data to be installed are received from the server having the security app, the management agent process 205 may ask for installation while providing the app data to be installed to the security mode management process 215 existing in the security mode in operation 506.

Accordingly, the security mode management process 215 installs the app through step 508 to generate a new security mode app process 216. Thereafter, the security mode management process 215 informs the user that the app has been installed. When the user mode is the non-security mode, the security mode management process 215 provides only information informing that the app has been installed to the notification message process 220 or the security mode notification proxy process 221. Accordingly, the notification message process 220 or the security mode notification proxy process 221 may display an indication that the process has been installed on the display unit 106.

Figure 6:
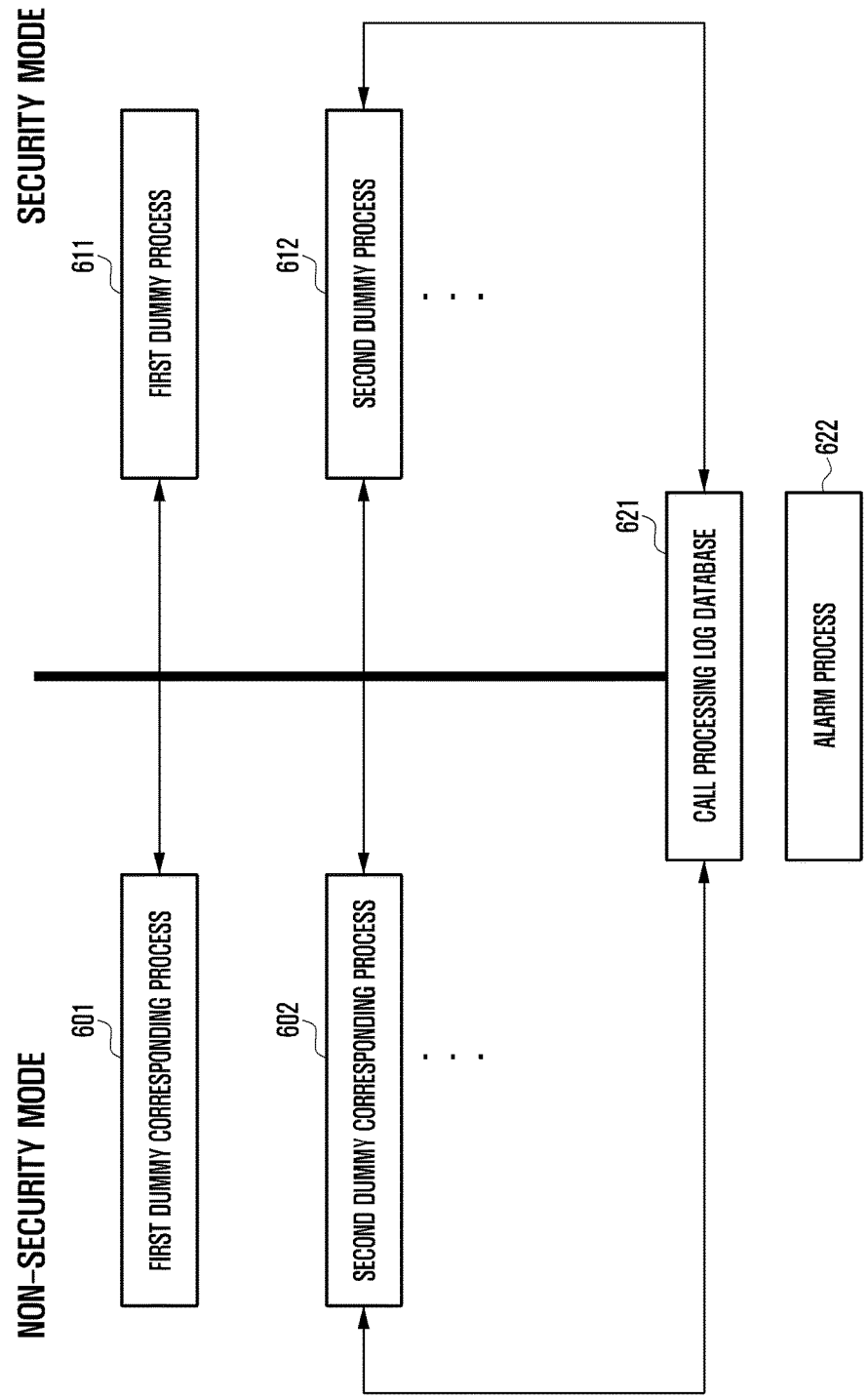
FIG. 6 is a view describing a display method when an electronic device having a non-security mode and a security mode shares an interface regardless of the mode according to embodiments of the present invention.

FIG. 6 illustrates an example describing a display method when the electronic device having the non-security mode and the security mode shares an interface regardless of the mode according to embodiments of the present invention.

Processes illustrated in FIG. 6 allow functions used in both the security mode and the non-security mode to display a dummy interface on the display unit 106 in the security mode and actual operations are performed by the processes of the non-security mode.

Accordingly, a first dummy process 611 and a second dummy process 612 of the security mode both correspond to dummy interfaces and may be processes performing only an operation for calling processes operating in the non-security mode. That is, the first dummy process 611 is a dummy process for calling a first dummy corresponding process 601 and the second dummy process 612 is a process for calling a second dummy corresponding process 602.

An actual operation is performed by the first dummy corresponding process 601 and the second dummy corresponding process 602. The processes may be, for example, a contact process, a calendar process, a clipboard process, a call processing log process, a dialer process, a message (SMS/MMS) process, or the like.

The dummy process corresponds to a one-way bridge for a connection of the process of the non-security mode and may be configured to operate only when a function of the non-security mode is attempted to be used in the security mode. Further, when the user executes the corresponding process, the dummy process is configured to perform a function of the non-security mode by calling the corresponding process provided in the non-security mode through the bridge. At this time, the dummy process may be configured to use a database included only in the security mode while performing the function of the non-security mode, as necessary.

Then, each of the above mentioned processes will be described in more detail. The contact process provides only basic information such as a phone number, a name, and a group when the contact process is called by the dummy process. Accordingly, information such as a speed dial, a photo ID, and a profile may be loaded, and the privacy of the user may be protected in the security mode. Further, when the contact process is called by the dummy process of the security mode, an editing of data read from the database may be impossible.

The calendar process is configured to only read basic information such as a subject and time when the corresponding data is shared. The clipboard performs the same operation in both the security mode and the non-security mode. However, data stored in the clipboard in the non-security mode may not be read in the security mode and data stored in the clipboard in the security mode may not be read in the non-security mode.

The call processing log process reads log information of an outgoing call and an incoming call from a call processing log database 621 equally in the security mode and the non-security mode. In FIG. 6, it is assumed that the second dummy process 612 and the second dummy corresponding process 602 are a call processing dummy process and a call processing corresponding process, respectively.

Further, the dialer process is configured to perform a dialing equally in the security mode as well as in the non-security mode.

An alarm process 622 operates equally in the security mode as well as in the non-security mode. Accordingly, as illustrated in FIG. 6, since there is no matter related to the security, the dummy process may be not used.

Figure 7:
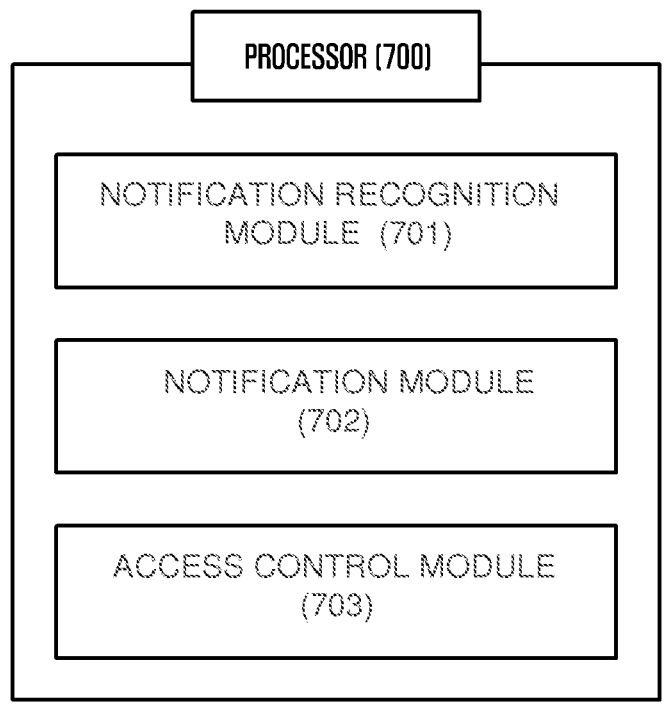
FIG. 7 illustrates a block diagram of an electronic device according to embodiments of the present invention.

FIG. 7 illustrates the electronic device according to embodiments of the present invention.

Referring to FIG. 7, the electronic device according to an embodiment of the present invention includes a notification recognition module 701, a notification module 702, an access control module 703, and a processor 700.

The electronic device according to an embodiment of the present invention may operate in one of a plurality of operation modes including a first operation mode and a second operation mode. For example, the first operation mode may be a mode set to encrypt data and store the encrypted data in a memory area which is separated from the remaining other operation modes (for example, second operation mode) and allocated to the first operation mode, to allow only an authenticated user to access the data stored in the memory area allocated to the first operation mode.

The notification recognition module 701 generates notification information to recognize the notification information of a first mode process activated in the first operation mode of the plurality of operation modes.

For example, at least a part or all of the notification recognition module 701 may be included in the first mode process having the generated notification information.

The notification module 702 is set to provide a notification to the user of the electronic device based on a part of the notification information generated in the notification recognition module 701 when a current operation mode is not the first operation mode. For example, the part of the notification information notified by the notification module 702 may include at least one of whether the notification information has been generated, a type of the generated notification information, a number of times that the notification information has been generated, and an amount of data included in the notification information.

For example, at least a part or all of the notification module 702 may be included in the first mode process having the generated notification information.

The notification module 702 is set to process a part of the notification information in various types and transmit the processed notification information to the user. For example, the part of the notification information may be displayed on at least a part of a display screen of the electronic device. Further, the notification may be provided to the user in various types, such as a notification sound, and a notification vibration as well as such a visual notification. The notification module according to the present invention does not limit a notification method itself.

The processor 700 executes at least one of the notification recognition module 701 and the notification module 702.

When an access request for resources set to be accessible only in the first operation mode is detected, the access control module 703 is set to block the access request if the current operation mode is not the first operation mode.

In some implementations, the access control module 703 may be set to display a message indicating that the access request has been blocked on the display screen of the electronic device.

In some implementations, the access control module 703 may be set to provide an authentication method to access the first operation mode and allow the access request of the user if the corresponding user succeeds in the authentication according to the provided authentication method.

Figure 8:
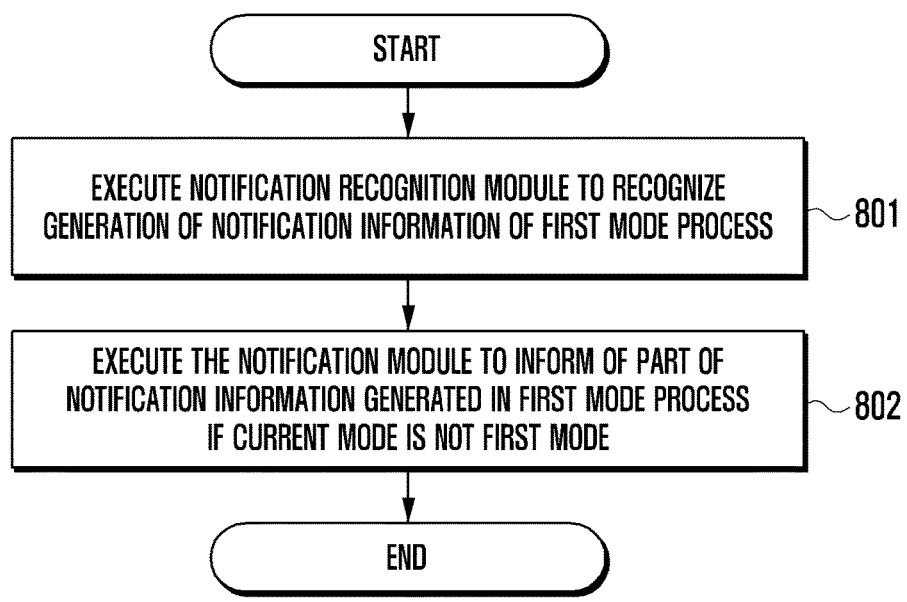
FIG. 8 is a flowchart of a method of notifying of limited information according to embodiments of the present invention.

FIG. 8 is a flowchart of a method of notifying of limited information according to embodiments of the present invention. The electronic device performing the method corresponding to the electronic device illustrated in FIG. 7.

Referring to FIG. 8, in step 801, the processor 700 of the electronic device executes the notification recognition module 701 to recognize the generation of the notification information of the first operation process activated in the first operation mode of the plurality of operation modes.

In step 802, the processor 700 of the electronic device executes the notification module 702 to give a notification to the user based on a part of the notification information generated in the first operation mode process if the current operation is not the first operation mode.

In step 802, the processor 700 processes a part of the notification information in various types and transmits the processed notification information to the user. For example, the part of the notification information may be displayed on at least a part of a display screen of the electronic device. Further, the notification may be provided to the user in various types, such as a notification sound, and a notification vibration as well as such a visual notification. The notification module according to the present invention does not limit a notification method.

Each of the operations described in this specification may be processed through a sequential, parallel, repetitive, or heuristic method and some of the operations may be omitted or other operations may be added.

The method according to the present invention as described above may be implemented as a program command which can be executed through various computers and recorded in a computer-readable recording medium. The recording medium may include a program command, a data file, and a data structure. The program command may be specially designed and configured for the present invention or may be used after being known to those skilled in computer software fields. The recording medium may include magnetic media such as a hard disk, a floppy disk and a magnetic tape, optical media such as a Compact Disc Read-Only Memory (CD-ROM) and a Digital Versatile Disc (DVD), magneto-optical media such as a floptical disk, and hardware devices such as a Read-Only Memory (ROM), a Random Access Memory (RAM) and a flash memory. Further, the program command may include a machine language code generated by a compiler and a high-level language code executable by a computer through an interpreter and the like. The hardware devices may be configured to operate as one or more software modules to realize the present invention.

Each of the modules disclosed in this specification may be configured by software, firmware, hardware, or a combination thereof. Further, some of the modules may be combined as one module or omitted. When they are combined, functions which have been performed by the corresponding modules before the combination may be equally performed.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents

What is claimed is:

1. A method of providing notification to a user of an electronic device, the method comprising:
   recognizing, by a secure operating system, at least one secure notification event occurred by at least one secure process;
   generating, by the secure operating system, a secure notification message using a portion of information on the at least one secure notification event when the electronic device is being operated in a non-secure operation mode;
   providing the secure notification message to a non-secure operating system; and
      in response to receiving the secure notification message, providing, by the non-secure operating system, the secure notification message to a user of the electronic device,
   wherein the secure notification message includes at least a number of times that the notification information has been genrated to the user.

2. The method of claim 1, wherein the portion of information includes at least one of whether notification information has been generated, a type of the notification information, the number of times that the notification information has been generated, and an amount of data included in the notification information.

3. The method of claim 1, wherein the portion of the information corresponds to a part of data to be displayed for the user in accordance with notification information while the electronic device operates with a secure operating system.

4. The method of claim 1, wherein providing, by the non-secure operating system, the secure notification message to the user comprises:
   transmitting at least the portion of the information to a notification message process which collects notification information by one or more secure processes generating the notification information; and
   notifying the user of the portion of the information by the notification message process.

5. The method of claim 1, wherein providing, by the non-secure operating system, the secure notification message to the user comprises:
   displaying at least the portion of the information on at least a part of a display screen of the electronic device.

6. The method of claim 1, wherein data of a secure process is encrypted and stored in a memory area separated from non-secure process data and allocated to secure process data, and wherein only an authenticated user is allowed to access data stored in the memory area allocated to secure process data.

7. The method of claim 1, further comprising:
detecting a request for access to resources set to be accessible only while the electronic device operates with a secure operating system; and
blocking the request for access while the electronic device operates with a non-secure operating system.

8. The method of claim 7, wherein blocking the request for access comprises:
displaying a message indicating that the request for access is blocked on a display screen of the electronic device.

9. The method of claim 7, further comprising:
providing an authentication method to access a secure operating system to the user; and
allowing the requested access if the user succeeds in authentication through the provided authentication method.

10. An electronic device comprising:
a recognition module which recognizes at least one secure notification event occurred by at least one secure process, generates a secure notification message using a portion of information on the at least one secure notification event when the electronic device is being operated in a non-secure operation mode, and provides the secure notification message to a non-secure operating system; and
a notification module which receives the secure notification message in the non-secure operating system, and provides the secure notification message to a user of the electronic device,
wherein the secure notification message includes at least a number of times that the notification information has been genrated to the user.

11. The electronic device of claim 10, wherein the portion of information includes at least one of whether notification information has been generated, a type of the notification information, the number of times that the notification information has been generated, and an amount of data included in the notification information.

12. The electronic device of claim 10, wherein the portion of the information corresponds to a part of data to be displayed for the user in accordance with notification information while the electronic device operates with a secure operating system.

13. Previously Presented) The electronic device of claim 10, wherein the notification module receives at least the portion of the information from a notification message process having notification information and notifies the user of the received portion of the information.

14. The electronic device of claim 10, wherein the notification module displays the portion of the information on at least a part of an area of a display screen of the electronic device.

15. The electronic device of claim 10, wherein data of a secure process is encrypted and stored in a memory area which is separated from non-secure process date and allocated to secure process data, and
wherein only an authenticated user is allowed to access the data stored in the memory area allocated to the secure process data.

16. The electronic device of claim 10, further comprising:
an access control module which, when an access request for resources set to be accessible only while the electronic device operates with a secure operating system is detected, blocks the access request while the electronic device operates with a non-secure operating system.

17. A non-transitory computer-readable storage medium storing commands, the commands being set to allow one or more processors to perform one or more operations when the commands are executed by the one or more processes, the one or more operations comprising:
recognizing, by a secure operating system, at least one secure notification event occurred by at least one secure process;
generating, by the secure operating system, a secure notification message using a portion of information on the at least one secure notification event when the electronic device is being operated in a non-secure operation mode;
providing the secure notification message to a non-secure operating system; and
in response to receiving the secure notification message, providing, by the non-secure operating system, the secure notification message to a user of the electronic device,
wherein the secure notification message includes at least a number of times that the notification information has been genrated to the user.

* * * * *